No. 615,175. Patented Nov. 29, 1898.
A. HILLERMANN & C. HEINEN.
COTTON CHOPPER.
(Application filed Nov. 20, 1897.)
(No Model.)
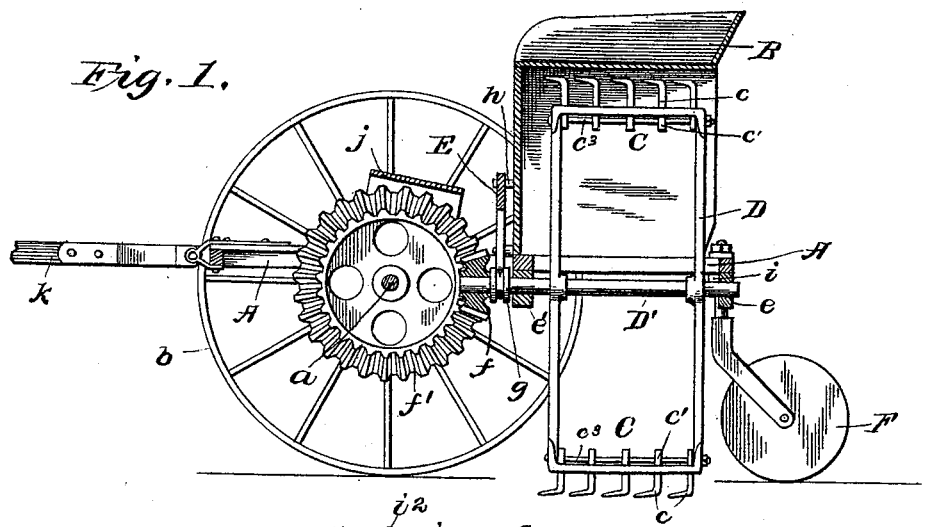
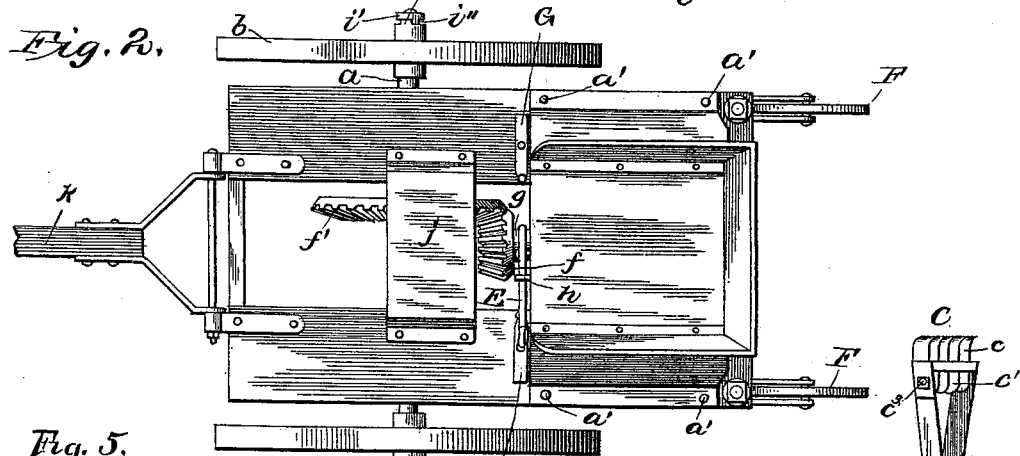
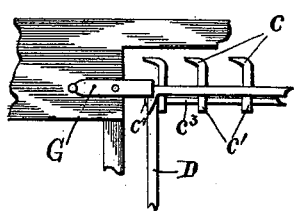
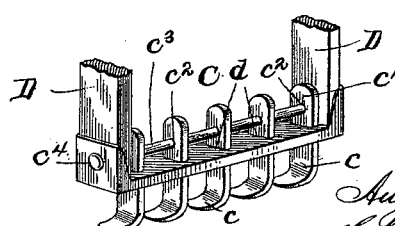
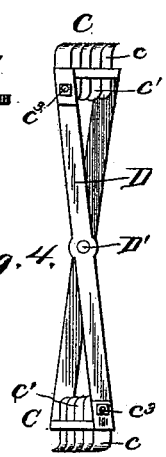
Witnesses:
Wm H. Edwards Jr.
J. F. Mothershead
August Hillermann
Christopher Heinen,
Inventors.
By Edson Bros.,
their Attorneys.

UNITED STATES PATENT OFFICE.

AUGUST HILLERMANN AND CHRISTOPHER HEINEN, OF HENRIETTA, TEXAS.

COTTON-CHOPPER.

SPECIFICATION forming part of Letters Patent No. 615,175, dated November 29, 1898.

Application filed November 20, 1897. Serial No. 659,321. (No model.)

*To all whom it may concern:*

Be it known that we, AUGUST HILLERMANN and CHRISTOPHER HEINEN, citizens of the United States, residing at Henrietta, in the county of Clay and State of Texas, have invented certain new and useful Improvements in Cotton-Choppers; and we do hereby declare the following to be a full, clear, and exact description of the invention, such as will enable others skilled in the art to which it appertains to make and use the same.

Our invention relates to certain improvements in cotton-choppers which are equally adapted for agricultural purposes generally wherein plants or the like require thinning out in their cultivation.

It has for its object to cause the knives or cutters to act successively upon the cotton or plants or rows and to permit them to be readily varied or one or more removed to adjust them greater or less intervals apart according to extent it is required to thin out the plants or shrubbery.

The invention is also characteristic for its steadiness of operation, facility and ease of manipulation, and simplicity of construction, and can be built at a minimum cost.

It consists, primarily, of the individual construction of the knives or cutters, their adaptability for varied arrangement along their carrying bar or frame, and the construction of their carrying-frame, and means to provide for the limited independent movement of either of the transporting or main drive wheels either back or forth, as may be required in turning the machine; also, of means to enable the cutters or knives to cut deep or shallow, all substantially as hereinafter more fully disclosed, and specifically pointed out in the claims.

In the preferred embodiment of our invention, illustrated in the accompanying drawings, Figure 1 is a longitudinal section thereof. Fig. 2 is a broken plan showing more fully the seat-securing bolts and nuts. Fig. 3 is a broken enlarged detail view showing more fully the detachability of the cutters or knives and means for holding the same on their carrying-frame. Fig. 4 is a side elevation of the knife-carrying frame and its cutters or knives. Fig. 5 is a detailed view showing chiefly just how the levers G hold the frame D.

In carrying out our invention it will be premised that all matters pertaining to details of the construction and arrangement of the aforesaid parts are to be treated simply as expedients, as they may be changed or varied as the judgment may suggest.

A refers to a frame, with a seat B preferably mounted or secured upon it, sulky-like, at its rear end, said frame being supported near its forward end upon an axle $a$, provided with wheels $b$. The seat is preferably held or secured at the lower corner edges of its side supporting portions by four nutted bolts $a'$, passing through flanges thereof and, it may be, through the frame side pieces or otherwise adapted to make connection therewith. By removing the nuts of three of these bolts and properly withdrawing the latter and loosening the nut of the fourth the seat may be swung to one side to allow the removal of the knife-carrying frame when desired.

C C are two series of cutters or knives with their blades or cutting portions $c$ each arranged about at an angle of forty-five degrees to its shank $c'$, and D is a frame carried by a shaft $D'$, passing about centrally therethrough and suitably supported in bearings $e\ e'$, secured to the frame A upon its under side. The knives or cutters C C have their shanks $c'$ passed through slots or apertures $d$ in the end or cross pieces of the frame D, with their cutting edges presented at right angles to the line of travel of the machine, obviously to cut or thin out the cotton or plants in the path of their movement. Passed through apertures $c^2$, one in the shank portion of each cutter or knife of each series, is a rod $c^3$, also passed through apertures $c^4$ in the side pieces of the frame D, the ends of said rods being suitably nutted on the outer sides of said side pieces, thus providing for securing in place each series of knives by a single rod or key. Also it will be seen that by temporarily withdrawing the rods or keys one or more of the knives or cutters can be removed and the distance between the same be varied, and the cotton or plants thus be thinned out to a greater or less extent, as desired.

The frame D has its longitudinal or side pieces arranged in slightly oppositely inclined or diagonal directions to each other, causing the end pieces of said frame carrying the knives or cutters to stand also in relatively slightly diagonal lines, whereby the knives are caused to act successively upon the plants or cotton, and thus lessen the resistance to the cutting action of the knives or cutters.

The shaft D', having secured thereto the knife-carrying frame D, has its forward end adapted to slide or move laterally in a slot in the bearing $e'$ for that end and is provided with a pinion $f$, adapted to be driven by a gear-wheel $f'$ on the axle of the main driving or transporting wheels.

A hand shipping-lever E, suitably pivoted in a bracket secured to the front supporting-piece of the seat, so as to be shifted laterally and having its upper end within convenient reach of the occupant of the latter, has its lower end forked, with the arms or prongs thereof arranged astride of the pinion end of the shaft D, a loose grooved collar $g$ being sleeved upon said shaft at that point to lessen friction between the parts. The lever E is also sufficiently loose upon its pivot to be moved forward past a stud or stop $h$, projecting from the front supporting-piece of the seat B, and by shifting said lever into either of its two points of adjustment the pinion $f$ of said shaft can be thrown into and out of gear with the wheel $f'$, thus providing for putting the knife-carrying frame into operation or taking it out of operation, as may be desired. The stud or stop $h$ provides for holding the lever E, and consequently the shaft D', from movement when the hand is removed therefrom or it is placed at either point of its adjustment, according as the pinion $f$ is in gear or out of gear with the wheel $f'$.

At the rear ends the frame A is supported, preferably, by two caster-wheels F, having their shank portions or spindles passing therethrough and suitably nutted above the frame, said spindles having loose collars thereon for the frame to rest upon. These collars are also provided with set or holding screws $i$ to provide for raising or lowering the frame A at the rear end, according as it is desired to thin or cut out the plants or cotton deep or shallow.

G G are foot levers or dogs fitted upon the footboard or platform of the frame A within convenient position or distance of the feet of the occupant of the seat B, adapted to engage and hold the knife-carrying frame D in the required position when out of operation.

The drawing or transporting wheel axle $a$ has at each end a collar $i'$, fitted upon an angular portion thereof or otherwise applied thereto, so as to secure it in a fixed position, and provided with a pin or stud $i''$, adapted to engage a projection or stud $i^2$ on the hub of the wheel, and thus provide for the independent movement of either wheel or both wheels in backing or turning the machine, as will be understood.

A foot-rest $j$, spanning or bridging the gear-wheel $f'$ and suitably secured to the platform portion of the frame A, prevents the accidental involvement of the feet of the driver with said wheel.

The tongue $k$ is loosely connected to the platform portion of the frame A, as shown, or otherwise to take the weight off the horses.

Having thus fully described our invention, what we claim, and desire to secure by Letters Patent, is—

1. In a cotton or plant chopper, the combination of the knife-carrying frame, having its longitudinal side pieces disposed in opposite relatively diagonal lines, also its end pieces, and the series of knives or cutters applied to said end pieces, said knives having their blades about at an angle of forty-five degrees to their shanks and their lateral cutting edges at a like angle to the line of travel, substantially as set forth.

2. In a cotton or plant chopper, the combination, with the knife-carrying frame, of the right-angled knives or cutters, with their shanks passed through apertures in the end or cross pieces of said frame, and a rod or key passed through apertures in the side pieces of said frame and in said knife or cutter shanks, substantially as described.

3. In a cotton or plant chopper, the combination of the knife-carrying frame having its longitudinal side pieces disposed in opposite relatively diagonal lines, also its end pieces, and the series of knives or cutters applied to said end pieces, to cause the knives to act successively in their cutting or thinning operation, substantially as set forth.

In testimony whereof we affix our signatures in presence of two witnesses.

AUGUST HILLERMANN.
CHRISTOPHER HEINEN.

Witnesses:
WIKOLES G. SHENK,
FRANK HOFF.